Patented Oct. 1, 1940

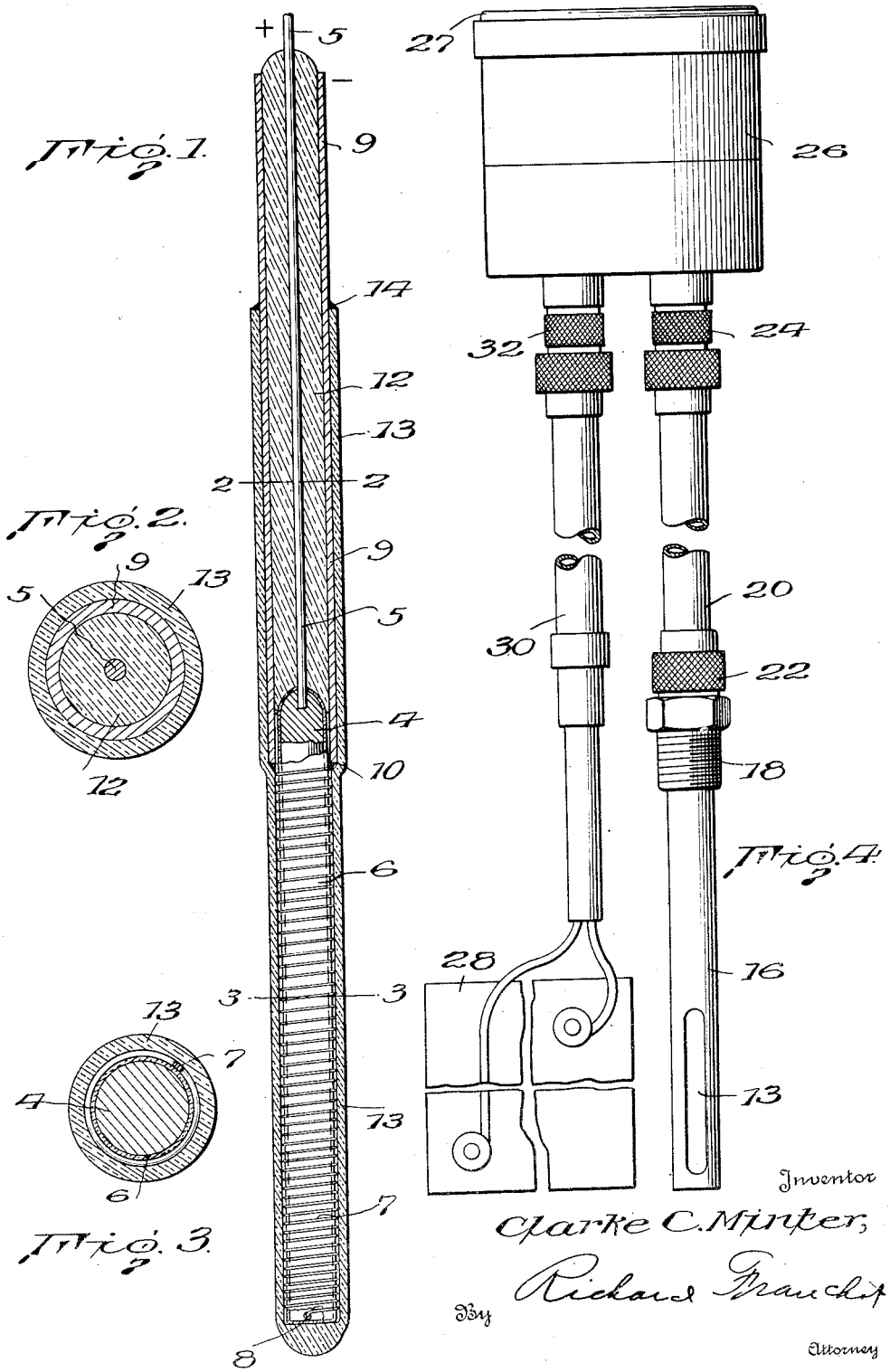

2,216,375

UNITED STATES PATENT OFFICE 2,216,375

RESISTANCE THERMOMETER

Clarke C. Minter, East Orange, N. J., assignor to Breeze Corporations, Incorporated, Newark, N. J., a corporation of New Jersey Application August 10, 1938, Serial No. 224,151

6 Claims. (Cl. 201—67)

This invention or discovery relates to resistance thermometers; and it comprises a thermometer including an inner metal tube or rod having an electrical lead wire, an adherent glass film or coating fused upon the metal rod, a resistance coil of metal wire wound upon the glass coating with an adherent seal thereto and electrically connected at one end to the metal inner member, an outer metal tubing fitted over the opposite end of the inner member and surrounding the lead wire thereof and separated therefrom by interposed fused glass and having an electrical connection with the other end of the resistance coil, the whole being enclosed in an evacuated glass tubing fused upon the resistance coil and the outer metal tubing; the glass of the inner and outer coatings and seals and the metal of the resistance coil, inner tube and outer tubing being matched in temperature coefficients of expansion and the union between the metal and the glass being advantageously reinforced by oxide films formed upon the metal and dissolved in the glass; and it comprises a complete temperature indicating assembly including a thermometer as above described; all as more fully hereinafter set forth and as claimed.

While resistance thermometers are known which measure temperature by the variations of electrical resistance in metal wire in response to changes of temperature, they, for the most part, leave much to be desired in sensitivity, accuracy, durability and reliability. Platinum wire resistors in fused quartz-glass seals, besides being expensive, have relatively low specific electrical resistance and low sensitivity to temperature change. The fusing of quartz-glass upon a platinum wire coil with subsequent annealing of the glass produces a low pressure tension in the platinum wire which affects the variations of its electrical resistance with temperature and thus its thermometric reliability.

Resistance thermometers having wire resistors open to the atmosphere are subject to considerable variation in the effect of temperature upon resistance. The time lag in this effect due to the air space surrounding the wire is a matter of serious disadvantage.

In the present invention, I have found and employed a method of sealing the resistor coil and its electrical connections in glass, which produces a thermometer of great sensitivity and permanent reliability. This invention advantageously utilizes base metals with glasses of matched thermal expansion coefficients to control and standardize the resistance characteristics of the resistor coil.

In accordance with the invention, I wind the metal resistance coil around a glass film coating, and advantageously fused upon, an inner metal member which may take the form of a cylindrical tube or solid rod, and I make an electrical connection between the coil and the inner member at one end. At the other end of the inner member or cylinder I provide an electrical lead wire. Surrounding or adjacent the glass coated cylinder at the lead wire end, I place an outer metal tubing, and within this tubing I fuse a glass tube around the lead wire, so as to fill the metal tubing with fused glass adhering to the tubing and to the lead wire. I connect the other end of the resistor coil to this outer metal tubing, and thus provide low resistance electrical leads to both ends of the coil. I then seal the thermometer, including the entire coil and most of the outer metal tubing, in a casing of glass adhering to the coil and to the tubing. This is advantageously accomplished by sliding a glass tube adapted to form the casing over the assembled thermometer, fusing one end of the tube to the outer metal tubing, evacuating the tube from the other end, fusing the evacuated tube onto the coil and the outer metal tubing, and sealing off the tube adjacent the end of the previously assembled thermometer parts.

The result is a solid assemblage of metal and glass quickly taking the temperature of its surroundings and responding without appreciable time lag to temperature changes. The low resistance of the inner metal cylinder and the outer metal tubing serving as electrical leads to the coil is a factor contributing to accuracy in measurements of the temperature response. The resistance characteristics of the coil are permanent, and variations of the coil resistance in direct ratio to temperature variation are readily measured by connection of the metal terminals to known electrical metering means, as for example a Wheatstone bridge with a galvanometer calibrated in temperature degrees corresponding to coil resistances.

By selecting metal and glass of approximately equal temperature coefficients of expansion, that is, a metal and glass matched in thermal expansivity for the range from ordinary temperatures to the annealing temperature of the glass, the manufacture of the thermometer is simplified and its durability and reliability assured. Also, the attainment of standardized temperature sensitivity is facilitated. Standardization of the temperature-resistance characteristics of the resistor coil may be improved by employing a glass having a slightly greater expansibility by heat than that of the metal. After sealing the metal parts from the air with such a glass, cooling the glass having greater expansibility (and contractibility) than the metal puts the metal under pressure (compression) and decreases the ohmic resistance of the coil by reason of its increased density. The temperature coefficient of resistance is simultaneously increased in approximately the same ratio. This increases the sensitivity to temperature variations.

A metal forming an oxide film when heated in the air is advantageous for the metal parts which are sealed in glass in my thermometer. In fusing the glass upon or around the metal by flame heat, an oxide film is formed upon the metal by the heat, and dissolves in the fused glass, reinforcing the union between glass and metal, and improving the seal. The oxide aids in the wetting of the metal surface by the glass.

For the metal to be used for the metal parts of the thermometer, I have found ferro alloys of nickel and cobalt to be advantageous, especially when employed with a boro-silicate glass matched in thermal expansion coefficient with the alloy. Proper matching of expansion coefficients is important. Nickel-cobalt alloys of iron base metal described in Scott Patent 1,942,260, have been found useful when sealed in fused boro-silicate glass. I have used to advantage a particular alloy known as "Kovar" with a boro-silicate glass known as Corning 704, and with one known as Corning 705 A. J. Any suitable metal may be used with a glass of the desired matched characteristics, however. The matching of nickel-cobalt ferro-alloys with boro-silicate glass is readily accomplished. The glass wets the metal and makes good seals. Matchings of different glasses with other metals are known.

The metal resistance coils sealed in glass in accordance with my invention should be of the length and wire size required to give a total resistance sufficient for accurate measurement of its variations with temperatures in the desired range. For example, a resistance of 100 ohms at 0° C. in 30 inches of .0025 gauge "Kovar" metal wire has been found particularly useful in indicating temperatures between —50° C. and +300° C.

In the accompanying drawing, I have shown more or less diagrammatically a resistance thermometer embodying my invention. In the drawing—

Fig. 1 is a view in longitudinal section of the thermometer proper;

Fig. 2 shows a cross section on the line 2—2 of Fig. 1;

Fig. 3 shows a cross section on the line 3—3 of Fig. 1; and

Fig. 4 is an assembly view, with parts broken away, of a complete unit including the thermometer described hereinabove.

Referring to the figures, a cylindrical inner member 4, such as a tube or rod having a connected electrical lead wire 5, is covered with a glass film coating 6. To form this film coating, a thin glass tube is readily fused upon the cylinder. The wire resistance coil 7 is wound about the film-covered metal cylinder 4, and electrically connected thereto at the end opposite from the lead wire, as by a spot weld at 8. An outer metal tubing 9 is placed over the lead wire 5, and usually over the end of the inner member 4 extending beyond the coil 7. This outer tubing is insulated from the inner member by the glass film 6. The free end of the resistance coil 7 (the upper end in the view shown) is electrically connected to the outer metal tubing, as by a weld indicated at 10. Thus the wire 5 and tubing 9 serve as positive and negative electrical terminals for the resistor coil.

Tubing 9 is internally sealed with fused glass 12, this being conveniently effected by running a tube of glass into the metal tubing around the lead wire 5 and fusing the glass between the metal tubing and the wire. The coil 7 and the tubing 9 are then sealed into an outer glass tube 13, this tube being conveniently sealed at the upper end to tubing 9, as indicated at 14, then evacuated from the lower end and fused to the tubing and the coil, then sealed off.

With the tubing and the glass suitably matched in thermal characteristics, as above described, the seals between the metal and the glass are tight and the metal coil is fully protected against access of liquids or gases during use of the thermometer. In making the inner cylinder, the wire coil, and the outer tubing of the same metal, advantageously a ferro alloy of nickel and cobalt, which may have fractional percentages of manganese and carbon in its composition, and using a boro-silicate glass of suitable characteristics for the fused glass seals, the seals between metal and glass are satisfactory both mechanically and thermally. The union of metal and glass is reinforced by oxide films formed on the metal surfaces when they are heated for the sealing, the oxide films dissolving in the glass during the sealing. A boro-silicate glass having a thermal expansivity somewhat greater than that of "Kovar" metal puts the resistance coil under a slight pressure and adds to the sensitivity of this coil, as noted hereinabove.

The thermometer structure as described is advantageous for various temperature ranges from below zero centigrade up to the highest temperatures which are withstood by the metal and the glass. If desired, the structure may be employed when using metal parts of platinum with lead glass or quartz-glass.

Fig. 4 illustrates a convenient assemblage for recording or indicating temperatures by the use of the thermometer previously described. In this assembly, the thermometer proper is enclosed in a case 16, which is adapted for mounting in any desired position, as by engaging the screw threads 18 in a suitable opening. This casing connects with a shielded cable 20, terminating in a connecting plug 22 adapted to make electrical connection with the lead wire 5 and the outer tubing 9 of the thermometer. Wires from these two terminals of the thermometer are run through the cable 20 to another connecting plug 24, which makes electrical connection with the metering or recording device 26.

This metering device may conveniently comprise a set of coils which, with the resistance coil 7 of the thermometer, constitute a Wheatstone bridge. Variation in the resistance of the coil 7 constituting a part of the bridge, when it is subjected to different temperatures, is indicated by a suitable galvanometer or millivoltmeter, which may conveniently be provided with a scale calibrated in degrees so that a temperature reading is directly obtained. This scale is advantageously enclosed by the meter body and a glass face 27, in known manner. Instead of an indicating scale, a recorder may, of course, be substituted if desired. Power required for the Operating of the bridge and the recording or indicating means may be provided from any suitable source, such as a battery 28 connected by a cable 30 and the connecting plug 32, for example, to a suitable terminal of the indicating or recording device 26. The meter body and the battery or other source of power may be mounted at any desired distance from the thermometer itself.

What I claim is:

1. A resistance thermometer comprising a resistance coil of metal wire electrically connected at its lower end to the lower end of an inner metal member, said resistance being wound upon a fused glass film, which film coats and adheres to the surface of the said inner member, a metal lead wire connected to the upper end of the inner member, an outer metal tubing surrounding the lead wire and the upper end of the inner member, the upper end of the resistance being connected to the lower end of the outer metal tubing, an adherent glass seal within the outer tubing and surrounding the lead wire, and an outer glass tubing fused upon the resistance coil and the outer metal tubing.

2. A resistance thermometer according to claim 1, wherein the glass of the inner film coating, the adherent glass seal and the outer tubing, and the metal of the inner member, the resistance coil and the outer tubing, are matched in temperature coefficients of expansion.

3. A resistance thermometer according to claim 1, wherein the union of the metal parts and the glass parts is reinforced by metal oxide films formed upon the metal surfaces and dissolved in the glass.

4. A resistance thermometer according to claim 1, wherein the metal of the inner cylinder, the resistance coil and the outer cylinder is a ferro alloy of nickel and cobalt and the glass is a boro-silicate glass matched with said alloy in thermal expansivity at temperatures below the annealing point.

5. A resistance thermometer comprising a resistance coil of metal wire wound upon and adhering to a glass film coating formed upon an inner metal cylinder having an electrical connection with the resistance coil at one end, an outer metal tubing fitted over the opposite end of the film coating upon the inner metal cylinder and electrically connected to the opposite end of the resistance coil and an outer adherent glass tubing of greater thermal expansivity than that of the resistance coil metal fused upon the resistance coil and exerting pressure increasing the thermal sensitivity of the coil.

6. A resistance thermometer assembly comprising a coil of resistance wire electrically connected at one end to an inner metal member adapted to support said coil and serve as an electrical lead thereto, said inner member being spaced from said coil by a glass film on which said coil is wound, an outer member connected to the other end of said coil and terminating adjacent said inner member and insulated therefrom by intervening glass, a glass sheath enclosing said coil and at least part of said outer member, and means for electrically connecting said inner member and said outer member to a device adapted to measure the resistance of said coil.

CLARKE C. MINTER.